United States Patent
Bigman et al.

(10) Patent No.: US 10,334,044 B1
(45) Date of Patent: Jun. 25, 2019

(54) MULTI-CLOUD DATA MIGRATION IN PLATFORM AS A SERVICE (PAAS) ENVIRONMENT

(71) Applicant: EMC Corporation, Hopkinton, MA (US)

(72) Inventors: Ron Bigman, Holon (IL); Jehuda Shemer, Kfar Saba (IL); Amit Lieberman, Raanana (IL); Assaf Natanzon, Tel Aviv (IL); Yana Vaisman, Hod Hasharon (IL); Oded Peer, Raanana (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 212 days.

(21) Appl. No.: 15/085,876

(22) Filed: Mar. 30, 2016

(51) Int. Cl.
*G06F 3/06* (2006.01)
*H04L 29/08* (2006.01)
*G06F 16/21* (2019.01)

(52) U.S. Cl.
CPC ........ *H04L 67/1097* (2013.01); *G06F 3/0631* (2013.01); *G06F 3/0647* (2013.01); *G06F 3/0646* (2013.01); *G06F 16/214* (2019.01)

(58) Field of Classification Search
CPC ............. G06F 17/30079; G06F 3/0647; G06F 17/30575; G06F 2009/4557; G06F 3/0631; G06F 3/0646; G06F 16/214
See application file for complete search history.

(56) References Cited

U.S. PATENT DOCUMENTS

| | | | | |
|---|---|---|---|---|
| 6,078,958 A * | 6/2000 | Echeita | .................. | H04H 20/42 709/226 |
| 2006/0149714 A1* | 7/2006 | Fellenstein | ............... | G06F 8/63 |
| 2008/0216086 A1* | 9/2008 | Tanaka | ..................... | G06F 3/061 718/105 |
| 2009/0300283 A1* | 12/2009 | Kudo | ....................... | G06F 3/061 711/114 |
| 2012/0254482 A1* | 10/2012 | Kabakura | ............. | G06F 3/0614 710/38 |
| 2014/0298338 A1* | 10/2014 | Doi | ........................ | G06F 9/4856 718/1 |
| 2014/0359129 A1* | 12/2014 | Sharma | ................... | H04L 47/70 709/226 |
| 2016/0269488 A1* | 9/2016 | Zhao | ....................... | H04L 67/10 |

* cited by examiner

*Primary Examiner* — Jeong S Park
(74) *Attorney, Agent, or Firm* — Womble Bond Dickinson (US) LLP (57) ABSTRACT

According to one embodiment, a request is received for estimating migrating a first dataset from a first cloud system to a second cloud system. A migration cost estimation module determines a network bandwidth required to migrate the first dataset from the first cloud system to the second cloud system, determines a duplicated data time period during migration that the first dataset has to be maintained by both the first cloud system and the second cloud system for service continuity, and determines a total cost of migrating the first dataset from the first cloud system to the second cloud system based on the required network bandwidth and the duplicated data time period. It is then determined whether to migrate the first dataset from the first cloud system to the second cloud system based on the total cost.

24 Claims, 5 Drawing Sheets

MULTI-CLOUD DATA MIGRATION IN PLATFORM AS A SERVICE (PAAS) ENVIRONMENT

FIELD OF THE INVENTION

Embodiments of the present invention relate generally to platform-as-a-service (PaaS) systems. More particularly, embodiments of the invention relate to multi-cloud data migration in a PaaS environment.

BACKGROUND

Cloud computing is a computing paradigm in which a customer pays a cloud provider to execute a program on computer hardware owned or controlled by the cloud provider. A cloud provider typically provides an interface that a user can use to configure resources such as processors, storage, and network services, etc., as well as an interface a user can use to install and execute the user's program on the platform that the user configuration and additional software on which the user's program needs.

Software and/or hardware facilities for facilitating the execution of applications in the cloud have been introduced and are referred to as platform-as-a-service (PaaS) offerings. PaaS offerings typically facilitate deployment of applications without the cost and complexity of buying and maintaining the underlying hardware and software and provisioning hosting capabilities, providing the infrastructure required to support the life cycle of the applications and services available from the Internet.

The PaaS platform may be hosted by multiple hosts, referred to as PaaS nodes, which may reside one or more cloud-based systems provided by one or more cloud providers. The cost to employ the cloud-based and/or PaaS services may be different from one cloud/PaaS provider to another. Some of the data can be backed up, replicated, or migrated from one cloud to another cloud. However, such data movement involves significant network bandwidth and processing resources. It is difficult to estimate the real cost of moving data between clouds.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, when deciding on an optimal cloud for data and services movement (e.g., backup, replication, migration), the system takes into account not only the parameters of all clouds, but also the current cloud being used and the cost and effort it would take to move the data and service to a different cloud. In addition to determining the cost for deploying applications, services, and data in a particular cloud, the cost for moving the applications, services, and data need to be considered as well. The cost for moving a dataset (representing an application, a service, and its associated data) may include the network traffic or bandwidth required to move the dataset and a time period during the data movement the duplicated dataset is maintained at both the source cloud and the target cloud for the purpose of service and data continuity.

According to one embodiment, a request is received for estimating migrating a first dataset from a first cloud system to a second cloud system. A migration cost estimation module determines a network bandwidth required to migrate the first dataset from the first cloud system to the second cloud system. The migration cost estimation module further determines a duplicated data time period during migration that the first dataset has to be maintained by both the first cloud system and the second cloud system for service continuity. The migration cost estimation module then determines a total cost of migrating the first dataset from the first cloud system to the second cloud system based on the required network bandwidth and the duplicated data time period. It is then determined whether to migrate the first dataset from the first cloud system to the second cloud system based on the total cost.

Figure 1:
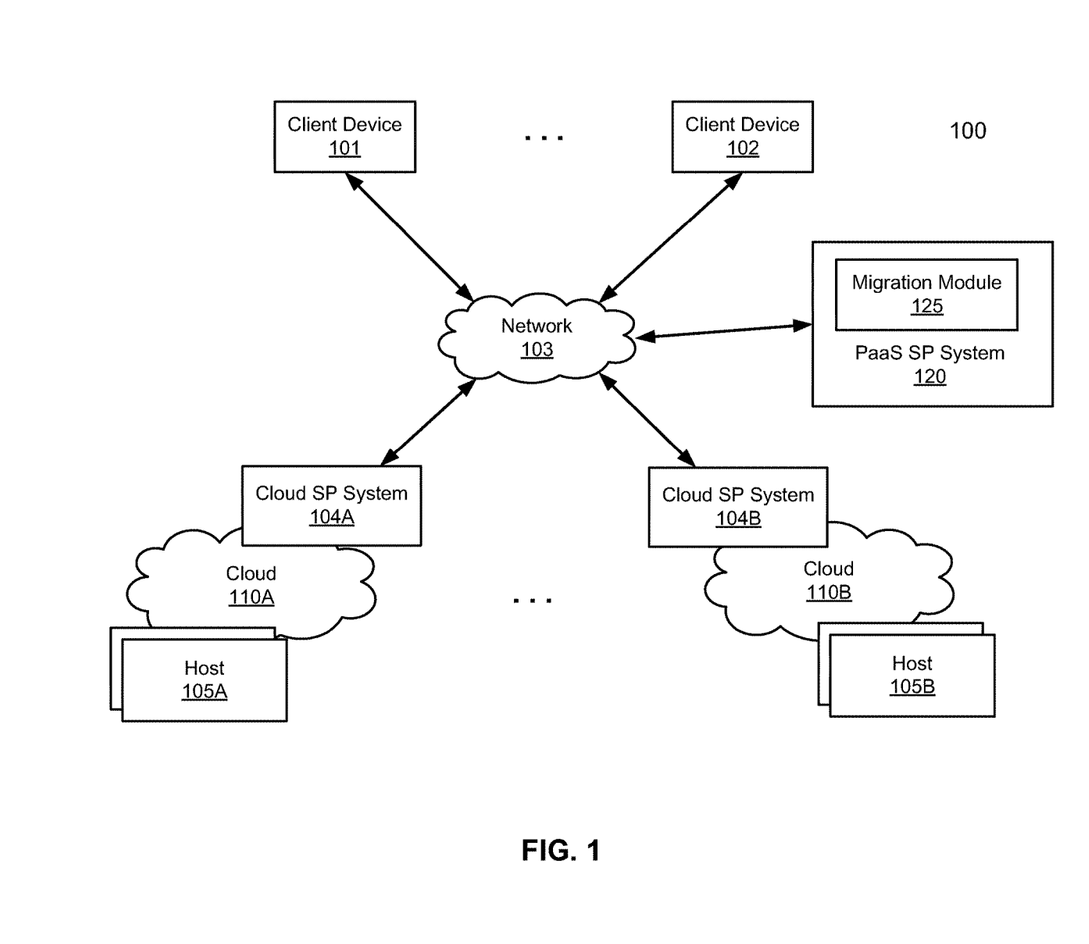
FIG. 1 is a block diagram illustrating a PaaS configuration which may be used with one embodiment of the invention.

FIG. 1 is a block diagram illustrating an example of a PaaS network architecture according to one embodiment of the invention. Referring to FIG. 1, network architecture 100 includes, but is not limited to, one or more clouds 110A-110B managed by cloud service provider (SP) systems 104A-104B, respectively, to provide cloud services to clients of client devices 101-102 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a cloud-based backup storage system in any of clouds 110A-110B. Network 103 may be any type of networks such as a local area network (LAN), a wide area network (WAN) such as the Internet, a fiber network, a storage network, or a combination thereof, wired or wireless.

Each of clouds 110A-110B may be provided by the same or a different cloud service provider, which may be represented by one of cloud SP systems 104A-104B. Clouds 110A-110B may be any kind of clouds, such as, for example, public clouds, private clouds, and/or hybrid clouds. Each cloud includes one or more hosts (e.g., 105A-105B) to host an operating environment or container to host an application and/or its associated data requested by clients 101-102. A cloud SP system (e.g., cloud SP systems 104A-104B) is configured to manage the hosts in the corresponding clouds (e.g., clouds 110A-110B). For example, cloud SP system 104A may receive a PaaS specification or requirement from PaaS system 120 specifying a particular requirement for a PaaS platform to be hosted in one of hosts 105A. In response, based on the PaaS requirement, cloud SP system 104A configures an operating environment (e.g., virtual machine or VM), installs and executes an application of a client in the operating environment, and loads the associated application data in the operating environment to be accessible by the application.

PaaS refers to a category of cloud computing services that provides a platform allowing customers to develop, run, and manage applications without the complexity of building and maintaining the infrastructure typically associated with developing and launching an app. PaaS can be delivered in two ways: as a public cloud service from a provider, where the consumer controls software deployment and configuration settings, and the provider provides the networks, servers, storage and other services to host the consumer's application; or as software installed in private data centers or public infrastructure as a service and managed by internal IT departments.

Referring back to FIG. 1, PaaS system 120 may further includes a resource manager (not shown) to monitor and manage the resource usages and execution of tasks or jobs in clouds 110A-110B via their respective cloud SP systems 104A-104B. In one embodiment, PaaS system 120 includes a migration module 125 (also referred to as migration manager) to configure, initiate, and manage data migration from one VM to another VM, from one host to another host, and/or from one cloud to another cloud. A request for data migration may come from a user request or be based on a load balancing need. In one embodiment, data migration may be initiated based on overall cost of providing cloud services on a particular cloud. As described above, different clouds provided by different cloud providers may have different cost structures. Migration module 125 is responsible for finding an optimal cloud to data migration based on cost.

According to one embodiment, in deciding whether to move data from one cloud (e.g., cloud 110A) to another cloud (e.g., cloud 110B), a migration cost estimation module of migration module 125 takes into account not only the parameters of all clouds, but also the current cloud being used (e.g., cloud 110A) and the cost and effort it would take to move the data and the service to a different cloud (e.g., cloud 110B). In addition to determining the cost for deploying applications, services, and data in a particular cloud, the cost for moving the applications, services, and data need to be considered as well. The cost for moving a dataset (representing at least a portion of an application, a service, and its associated data) may include the network traffic or bandwidth required to move the dataset (e.g., from cloud 110A to cloud 110B) and a time period during the data movement the duplicated dataset is maintained at both the source cloud and the target cloud for the purpose of service and data continuity. Note that the logic determining the cost for data migration, in this example, migration module 125, may also be implemented in other places, such as, for example, cloud SP systems 104A-104B, or hosts 105A-105B, etc. The term of "dataset" refers to any data that is suitable for migration. For example, a dataset can be a data object, a segment of a file, a file, a directory of one or more files, a service, a data object related to a particular service, a database, or a table of a database, etc.

Figure 2:
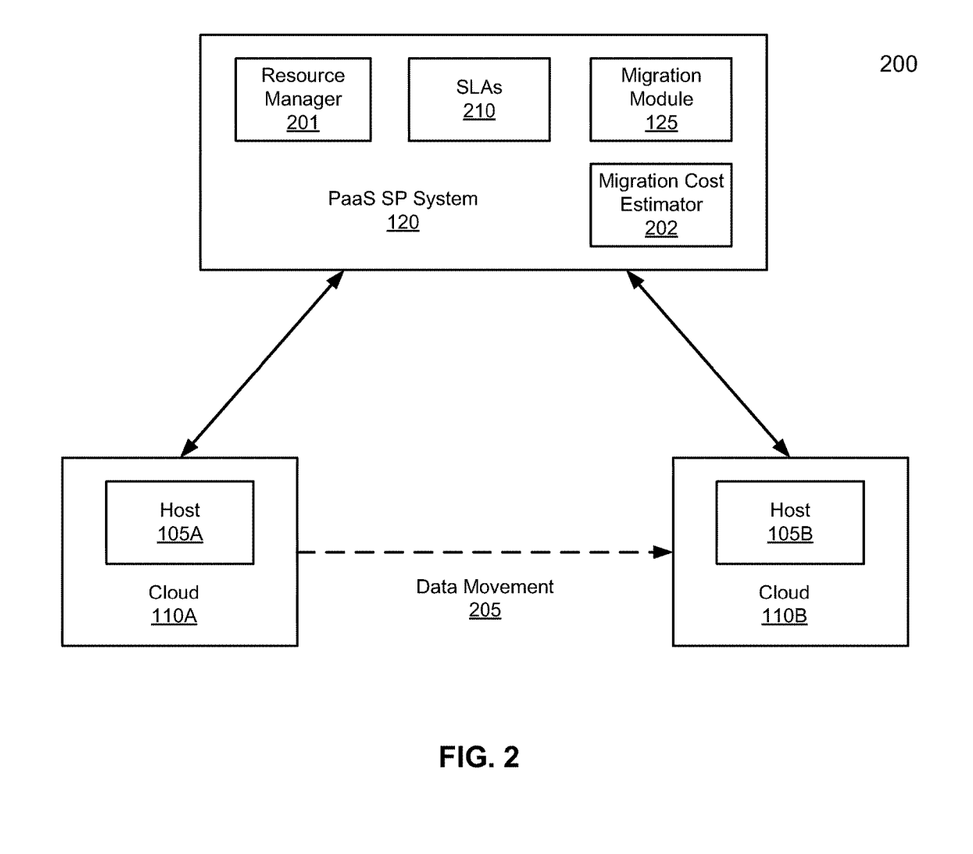
FIG. 2 is a block diagram illustrating an example of a data migration configuration according to one embodiment of the invention.

FIG. 2 is a block diagram illustrating an example of a data migration configuration according to one embodiment of the invention. Referring to FIG. 2, PaaS SP system 120 is communicatively coupled to cloud 110A and cloud 110B via their respective cloud SP systems over a network. PaaS SP system 120 includes, but is not limited to, resource manager 201, data migration module 125, migration cost estimation module 202, and service level agreements (SLAs) 210. SLAs 210 may be configured for multiple tenants, where an SLA includes information specifying the agreement about anything between a tenant client and the PaaS system. For example, an SLA may specify what kinds of applications to be deployed, data to be accessed, resources to be utilized (e.g., processor, memory, storage, network stack), as well as the cost associated therewith.

Resource manager 201 is to configure, monitor, and manage the resources utilized by the PaaS nodes that are deployed in the clouds, such as, clouds 110A-110B. Data migration module 125 is responsible for migrating data between VMs, nodes, or clouds. In this example, for the purpose of illustration, data migration module 125 is to configure, initiate, and manage data migration from cloud 110A (also referred to as a source cloud) to cloud 110B (also referred to as a target or destination cloud). Prior to initiating data migration of a dataset, data migration module 125 invokes migration cost estimator 202 to estimate the cost to migrate or move the dataset to determine whether such data migration has any benefit, if so, how much benefit a customer will have. In this example, it is assumed data migration module 125 attempts to migrate or move dataset 211A from cloud 110A to cloud 110B as dataset 211B.

According to one embodiment, when a request is received for estimating migrating a dataset 211A from cloud 110A (e.g., first cloud system) to cloud 110B (e.g., a second cloud system), migration cost estimation module 202 determines a network bandwidth required to migrate or move dataset 211A from cloud 110A to cloud 110B over a network as indicated by path 205. Migration cost estimation module 202 determines a duplicated data time period during migration that the dataset 211A has to be maintained by both clouds 110A-110B for service continuity. For example, during the data migration, a client has to be able to access the same dataset from either of clouds 110A-110B so that the cloud services would not be disrupted. Migration cost estimation module 202 then determines a total cost of migrating the dataset from cloud 110A to cloud 110B based on the required network bandwidth and the duplicated data time period. In one embodiment, the total cost of data migration may be determined further based on the processing resources that are required to move the dataset from the source cloud to the destination cloud. Based on the total cost provided by migration cost estimation module 202, data migration module 125 can then decide whether to migrate the dataset from cloud 110A to cloud 110B.

Figure 3:
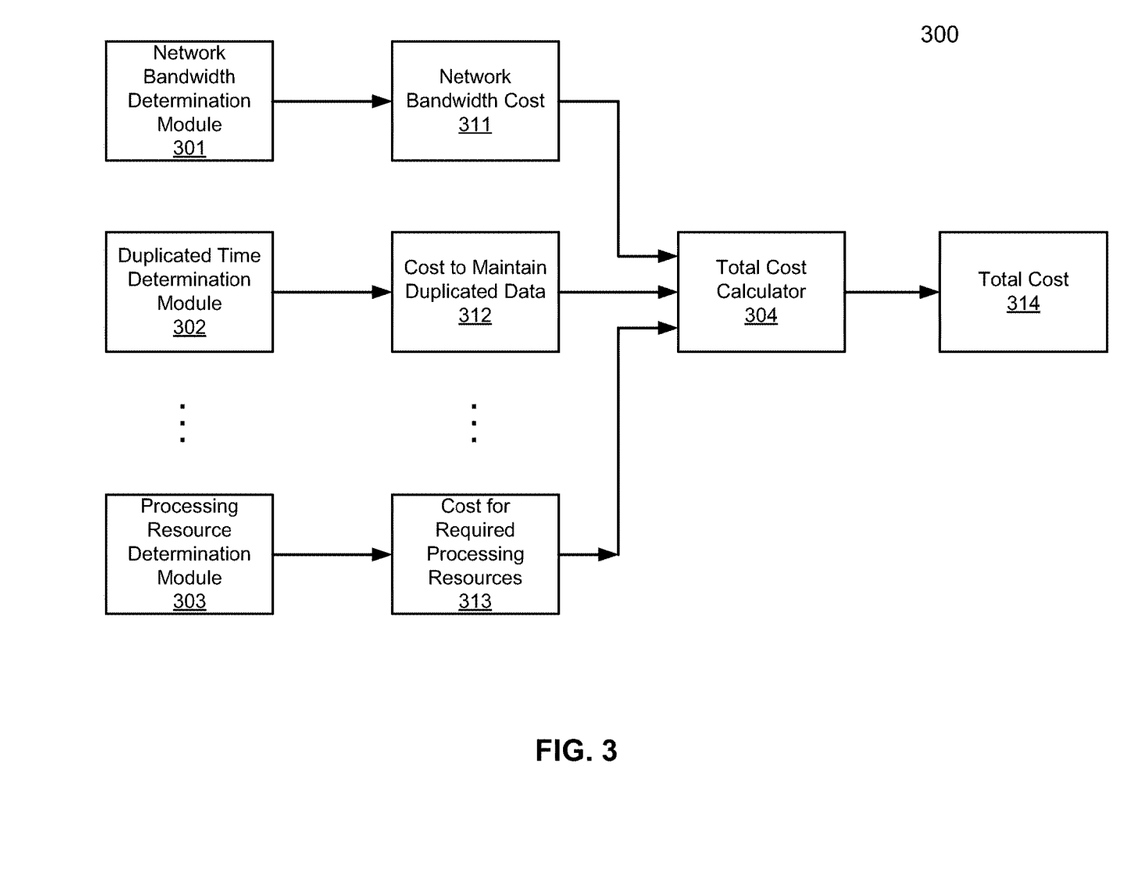
FIG. 3 is a block diagram illustrating a processing flow of a migration cost estimation according to one embodiment of the invention.

FIG. 3 is a block diagram illustrating a processing flow of a migration cost estimation according to one embodiment of the invention. Process 300 may be performed by migration cost estimation module 202, which may be implemented in software, hardware, or a combination thereof. Referring to FIG. 3, migration cost estimation module 202 (also simply referred to as a cost estimator) includes network bandwidth determination module 301, duplicated time determination module 302, and processing resource determination module 303, as well as other modules as needed dependent upon the specific configuration. In one embodiment, network bandwidth determination module 301 is to determine network bandwidth cost 311 representing the cost of having the necessary network bandwidth or network resources to move a dataset from a source cloud to a target cloud. Duplicated time determination module 302 is to determine cost 312 to maintain the dataset available for a time period at both the source cloud and the target cloud during the data migration, such that the corresponding cloud services would not be disrupted. Processing resource determination module 303 is to determine cost 313 to allocate and utilize the necessary processing resources to move the dataset. The total cost 314 is then calculated by total cost calculator 304 based on costs 311-313 using a predetermined formula. In one embodiment, the total cost 314 is a sum of costs 311-313.

In one embodiment, cost for required processing resources 313 is determined based on a cost of a central processing unit (CPU) cycle (e.g., cost per CPU cycle), the size of the dataset (e.g., transfer size), and a number of CPU cycles required to transfer a predetermined data unit (e.g., megabyte or MB). In a particular embodiment, cost 313 is calculated based on a multiplication of the cost of a CPU cycle, the size of dataset in MBs, and a number of CPU cycles required for transferring one MB. In one embodiment, the cost of a CPU cycle and a number of CPU cycles required for transferring one MB may be obtained from an SLA of the client, which may be negotiated between the client and the PaaS provider.

In addition to the cost related to CPU cycles, the cost for required processing resources 313 may further be determined based on input and output (IO) cycles or transactions required to move data. In one embodiment, cost for required processing resources 313 is determined based on a cost of an input and output (IO) cycle or transaction (e.g., cost per IO cycle), the size of the dataset (e.g., transfer size), and an amount of data can be accessed per IO cycle (referred to herein as IO size). The IO size may be predefined based on an SLA. In a particular embodiment, cost for required processing resources 313 is determined by multiplying the cost of an IO cycle with the size of the dataset and divided by the IO size. Thus, the total cost for required processing resources 313 may be determined based on the cost of both the CPU cycles and the IO cycles.

In one embodiment, cost for required network bandwidth or resources 311 is determined based on a cost for moving a predetermined data unit (e.g., MB) over a network and the size of the dataset (e.g., transfer size). In a particular embodiment, cost 311 is calculated by multiplying the cost for moving one MB and the transfer size in MBs. If data compression is utilized, the compression rate of the dataset is also considered, for example, by multiplying the data compression rate of the dataset with the cost for moving one MB and the transfer size in MBs. For example, if the compression rate is ⅓, cost 311 will be reduced by ⅔. The cost for moving a predetermined data unit may be obtained from the corresponding SLA of the client.

In one embodiment, cost to maintain duplicated data at both clouds 312 is determined based on a data transfer rate, a transfer unit cost, and the size of the dataset (e.g., transfer size in MBs). Data transfer rate refers to the amount of data that can be transferred over a network within a predetermined time unit (e.g., MB per second or MBPS). The transfer unit cost and/or the transfer rate may be obtained from the corresponding SLA. A transfer unit cost is the cost for transferring data for a predetermined time unit (e.g., a second). In one particular embodiment, cost 312 is calculated as follows:

$$transfer\_size/MBPS * transfer\_unit\_cost$$

As described above, a dataset refers to any data that is suitable for migration. For example, a dataset can be a data object, a segment of a file, a file, a directory of one or more files, a service, a data object related to a particular service, a database, or a table of a database, etc. In some situations, data migration is performed on a per dataset basis, i.e., one data set at a time. Thus, dependent upon the size of a dataset, the size of duplicated data may vary. For example, it is assumed there are two datasets: dataset A and dataset B, where dataset A has been migrated to a target while dataset B has not been migrated. In response to a query, only dataset A should be maintained in both the source and target storage systems as duplicated data. In another example, assuming there are 100 tables in a database, the data movement process moves one table at a time. During the data movement, it will take 101% of the total storage capacity and thus, the duplication of data is relatively minor.

The techniques above can be utilized to identifying an optimal cloud for possible migration. This can be done on a per application basis. For example, if an application is located in cloud A, and considering moving to cloud B. The price on cloud A would be X per day, while the price on cloud B would be Y per day (assuming X>Y). The question one must ask is how much time this price difference would remain. To answer that, one needs to know for how much time that specific price will be guaranteed. This is something that the cloud provider will provide as part of its offer. Given these parameters, the algorithm could easily determine the optimal cloud for each service/application. This would be, given into account the current cloud, going over all clouds offering better deals, to calculate 1) the total cost of transfer (time of transfer*cost of duplicated services+total cost of data movement); and 2) the benefit of the transfer (Gurenteed_Time_For_Reduced_Price*Price_difference). It can then select the cloud in which (2) is bigger by (1) by the highest amount.

Figure 4:
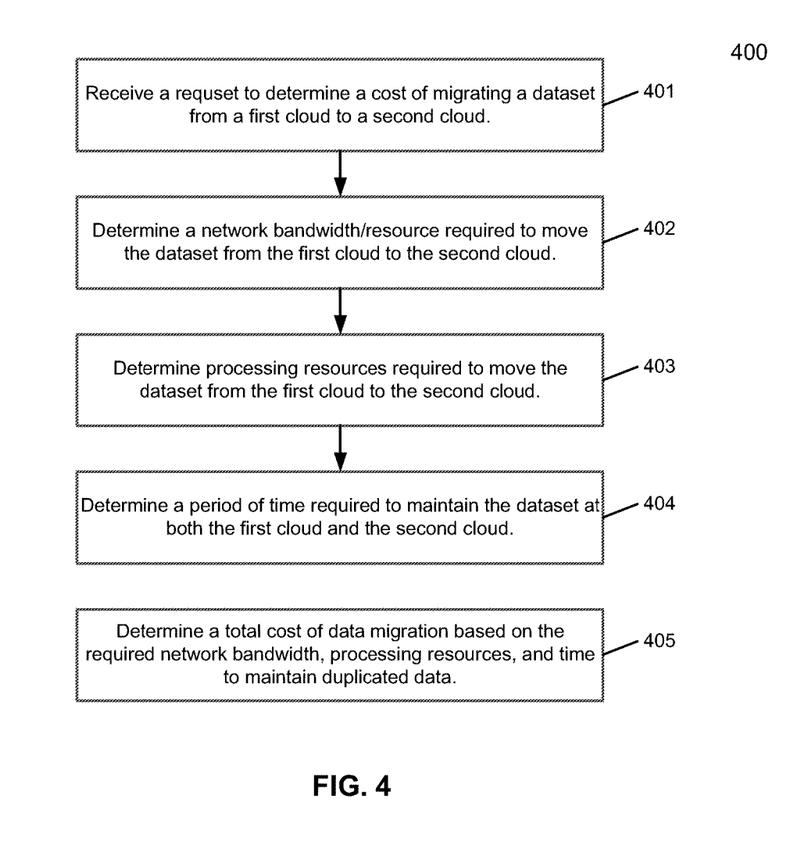
FIG. 4 is a flow diagram illustrating a process for determining the cost for data migration of an application according to one embodiment of the invention.

FIG. 4 is a flow diagram illustrating a process for determining the cost for data migration of an application according to one embodiment of the invention. Process 400 may be performed by processing logic which may include software, hardware, or a combination thereof. For example, process 400 may be performed by migration cost estimator 202 of FIG. 2. Referring to FIG. 4, at block 401, processing logic receives a request to determine a cost for migrating a dataset from a first cloud to a second cloud. At block 402, processing logic determines a network bandwidth or resources required to move the dataset from the first cloud to the second cloud. At block 403, processing logic determines processing resources required to move the dataset from the first cloud to the second cloud. At block 404, processing logic determines a cost to maintain deduplicated data at both the first cloud and the second cloud for a period of time during the migration. At block 405, a total cost for data migration is determined based on the cost of the required network bandwidth/resources, the cost of required processing resources, and the cost of maintaining the duplicated data at both clouds.

Note that some or all of the components as shown and described above (e.g., migration module 125 of FIG. 1) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 5:
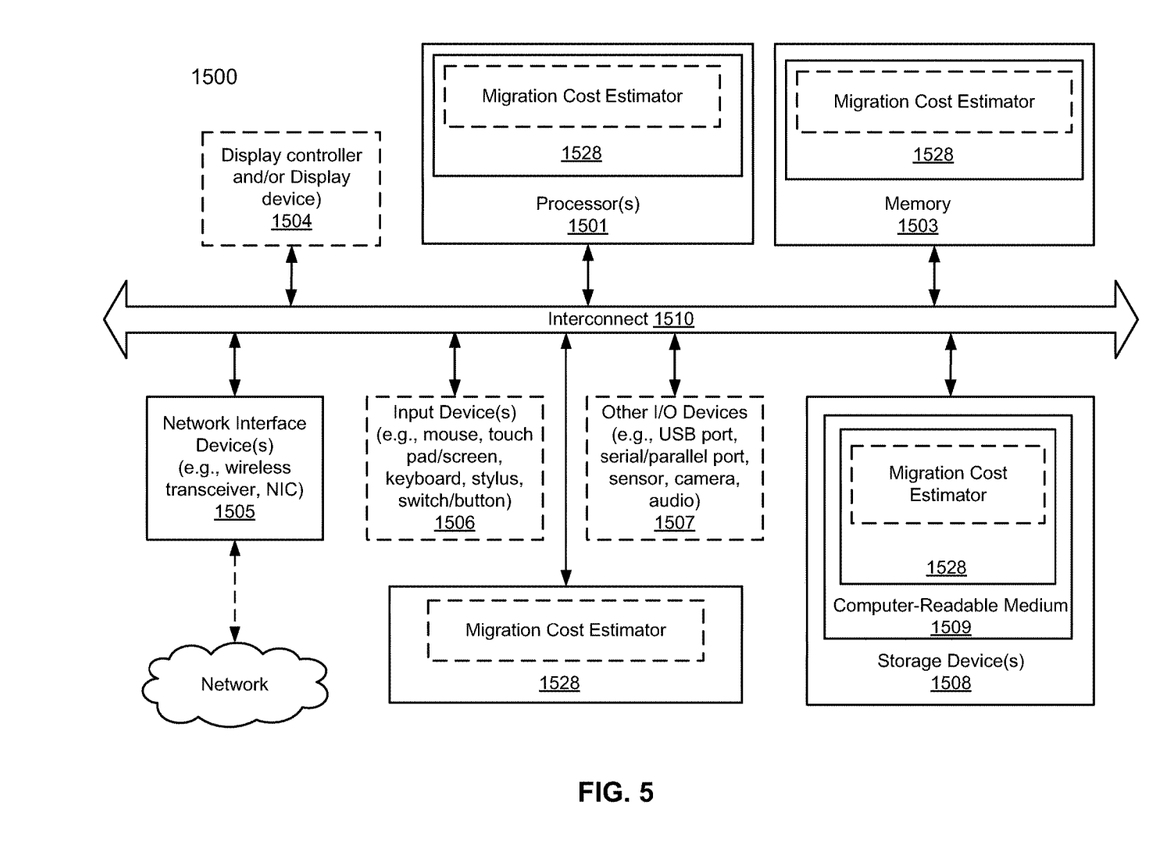
FIG. 5 is a block diagram illustrating a data processing system according to one embodiment.

FIG. 5 is a block diagram illustrating an example of a data processing system which may be used with one embodiment of the invention. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for multi-cloud data migration of a platform-as-a-service (PaaS) environment, the method comprising:
   receiving a request for estimating migrating a first dataset from a first cloud system to a second cloud system;

determining, by a migration cost estimation module executed by a processor, a network bandwidth required to migrate the first dataset from the first cloud system to the second cloud system;

determining by the migration cost estimation module a duplicated data time period during migration that the first dataset has to be maintained as duplicated data by both the first cloud system and the second cloud system for service continuity, wherein determining duplicated data time period comprises: determining a data transfer rate representing an amount of data can be transferred over the network within a predetermined time unit; determining a transfer unit cost for transferring data for each predetermined time unit; determining a size of the first dataset; and calculating the duplicated data time period based on the data transfer rate, the transfer unit cost, and the size of the first dataset;

determining by the migration cost estimation module a total cost of migrating the first dataset from the first cloud system to the second cloud system based on the required network bandwidth and the duplicated data time period;

determining whether to migrate the first dataset from the first cloud system to the second cloud system based on the total cost; and migrating the first dataset from the first cloud system to the second cloud system in response to a positive determination to migrate.

2. The method of claim 1, further comprising determining processing resources required to migrate the first dataset from the first cloud system to the second cloud system, wherein the total cost of the migration is determined further based on the determined processing resources.

3. The method of claim 2, wherein determining processing resources required to migrate the first dataset comprises:

determining a cost of a central processing unit (CPU) cycle;

determining a size of the first dataset;

determining a number of CPU cycles required to transfer a predetermined data unit; and calculating the required processing resources based on the cost of a CPU cycle, the size of the first dataset, and the number of CPU cycles required.

4. The method of claim 3, wherein the required processing resources are calculated based on a multiplication of the cost of a CPU cycle, the size of the first dataset, and the number of CPU cycles required.

5. The method of claim 3, wherein determining processing resources required to migrate the first dataset further comprises:

determining a cost of an input and output (IO) cycle;

determining a size of the first dataset;

determining an IO size representing an amount of data can be accessed per IO cycle; and calculating the required processing resources based on the cost of an IO cycle, the size of the first dataset, and the IO size.

6. The method of claim 5, wherein the required processing resources are calculated based on a multiplication of the cost of an IO cycle and the size of the first dataset, and divided by the IO size.

7. The method of claim 1, wherein determining a network bandwidth required to migrate the first dataset comprises:

determining a cost of moving a predetermined data unit over a network;

determining a size of the first dataset; and calculating the required network bandwidth based on the size of the first dataset and the cost of moving a predetermined data unit over a network.

8. The method of claim 7, further comprising determining a data compression rate of the first dataset, wherein the required network bandwidth is calculated further based on the data compression rate of the first dataset.

9. The method of claim 8, wherein the required network bandwidth is calculated based on a multiplication of the size of the first dataset and the cost of moving a predetermined data unit over a network in view of the data compression rate.

10. A non-transitory machine-readable medium having instructions stored therein, which when executed by a processor, cause the processor to perform operations of estimating cost for data migration, the operations comprising:

receiving a request for estimating migrating a first dataset from a first cloud system to a second cloud system;

determining a network bandwidth required to migrate the first dataset from the first cloud system to the second cloud system;

determining a duplicated data time period during migration that the first dataset has to be maintained as duplicated data by both the first cloud system and the second cloud system for service continuity, wherein determining duplicated data time period comprises: determining a data transfer rate representing an amount of data can be transferred over the network within a predetermined time unit; determining a transfer unit cost for transferring data for each predetermined time unit; determining a size of the first dataset; and calculating the duplicated data time period based on the data transfer rate, the transfer unit cost, and the size of the first dataset;

determining a total cost of migrating the first dataset from the first cloud system to the second cloud system based on the required network bandwidth and the duplicated data time period;

determining whether to migrate the first dataset from the first cloud system to the second cloud system based on the total cost; and migrating the first dataset from the first cloud system to the second clouds system in response to a positive determination to migrate.

11. The machine-readable medium of claim 10, wherein the operations further comprise determining processing resources required to migrate the first dataset from the first cloud system to the second cloud system, wherein the total cost of the migration is determined further based on the determined processing resources.

12. The machine-readable medium of claim 11, wherein determining processing resources required to migrate the first dataset comprises:

determining a cost of a central processing unit (CPU) cycle;

determining a size of the first dataset;

determining a number of CPU cycles required to transfer a predetermined data unit; and calculating the required processing resources based on the cost of a CPU cycle, the size of the first dataset, and the number of CPU cycles required.

13. The machine-readable medium of claim 10, wherein the required processing resources are calculated based on a multiplication of the cost of a CPU cycle, the size of the first dataset, and the number of CPU cycles required.

14. The machine-readable medium of claim 12, wherein determining processing resources required to migrate the first dataset further comprises:
- determining a cost of an input and output (IO) cycle;
- determining a size of the first dataset;
- determining an IO size representing an amount of data can be accessed per IO cycle; and
- calculating the required processing resources based on the cost of an IO cycle, the size of the first dataset, and the IO size.

15. The machine-readable medium of claim 14, wherein the required processing resources are calculated based on a multiplication of the cost of an IO cycle and the size of the first dataset, and divided by the IO size.

16. The machine-readable medium of claim 10, wherein determining a network bandwidth required to migrate the first dataset comprises:
- determining a cost of moving a predetermined data unit over a network;
- determining a size of the first dataset; and
- calculating the required network bandwidth based on the size of the first dataset and the cost of moving a predetermined data unit over a network.

17. The machine-readable medium of claim 16, wherein the operations further comprise determining a data compression rate of the first dataset, wherein the required network bandwidth is calculated further based on the data compression rate of the first dataset.

18. The machine-readable medium of claim 17, wherein the required network bandwidth is calculated based on a multiplication of the size of the first dataset and the cost of moving a predetermined data unit over a network in view of the data compression rate.

19. A data processing system, comprising:
- a processor;
- a memory coupled to the processor; and
- a migration estimation module executed by the processor to perform operations, the operations including
  - receiving a request for estimating migrating a first dataset from a first cloud system to a second cloud system,
  - determining a network bandwidth required to migrate the first dataset from the first cloud system to the second cloud system,
  - determining a duplicated data time period during migration that the first dataset has to be maintained as duplicated data by both the first cloud system and the second cloud system for service continuity, wherein determining duplicated data time period comprises: determining a data transfer rate representing an amount of data can be transferred over the network within a predetermined time unit; determining a transfer unit cost for transferring data for each predetermined time unit; determining a size of the first dataset; and calculating the duplicated data time period based on the data transfer rate, the transfer unit cost, and the size of the first dataset,
  - determining a total cost of migrating the first dataset from the first cloud system to the second cloud system based on the required network bandwidth and the duplicated data time period,
  - determining whether to migrate the first dataset from the first cloud system to the second cloud system based on the total cost; and
  - migrating the first dataset from the first cloud system to the second cloud system in response to a positive determination to migrate.

20. The system of claim 19, wherein the operations further comprise determining processing resources required to migrate the first dataset from the first cloud system to the second cloud system, wherein the total cost of the migration is determined further based on the determined processing resources.

21. The system of claim 20, wherein determining processing resources required to migrate the first dataset comprises:
- determining a cost of a central processing unit (CPU) cycle;
- determining a size of the first dataset;
- determining a number of CPU cycles required to transfer a predetermined data unit; and
- calculating the required processing resources based on the cost of a CPU cycle, the size of the first dataset, and the number of CPU cycles required.

22. The system of claim 21, wherein determining processing resources required to migrate the first dataset further comprises:
- determining a cost of an input and output (IO) cycle;
- determining a size of the first dataset;
- determining an IO size representing an amount of data can be accessed per IO cycle; and
- calculating the required processing resources based on the cost of an IO cycle, the size of the first dataset, and the IO size.

23. The system of claim 19, wherein determining a network bandwidth required to migrate the first dataset comprises:
- determining a cost of moving a predetermined data unit over a network;
- determining a size of the first dataset; and
- calculating the required network bandwidth based on the size of the first dataset and the cost of moving a predetermined data unit over a network.

24. The system of claim 23, wherein the operations further comprise determining a data compression rate of the first dataset, wherein the required network bandwidth is calculated further based on the data compression rate of the first dataset.

* * * * *